United States Patent
Prabhakar et al.

(10) Patent No.: US 11,140,616 B2
(45) Date of Patent: Oct. 5, 2021

(54) ON DEMAND SYSTEM INFORMATION BLOCK ACQUISITION

(71) Applicant: Apple Inc., Cupertino, CA (US)

(72) Inventors: Alosious Pradeep Prabhakar, Singapore (SG); Rohit R. Matolia, Surat (IN); Vijay Venkataraman, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/831,883

(22) Filed: Mar. 27, 2020

(65) Prior Publication Data

US 2020/0322878 A1 Oct. 8, 2020

(30) Foreign Application Priority Data

Apr. 3, 2019 (IN) .............................. 201941013527

(51) Int. Cl.
*H04W 4/00* (2018.01)
*H04W 48/14* (2009.01)
(Continued)

(52) U.S. Cl.
CPC ............ *H04W 48/14* (2013.01); *H04W 4/90* (2018.02); *H04W 36/08* (2013.01); *H04W 36/14* (2013.01);
(Continued)

(58) Field of Classification Search
CPC ....... H04W 4/14; H04W 36/04; H04W 36/18; H04W 36/30; H04W 36/32; H04W 48/16; H04W 48/18; H04W 60/00
(Continued)

(56) References Cited

U.S. PATENT DOCUMENTS

2009/0233554 A1 9/2009 Sammour et al.
2011/0263282 A1 10/2011 Rune et al.
(Continued)

FOREIGN PATENT DOCUMENTS

WO 2017105317 A1 6/2017
WO 2017150863 A1 8/2017
(Continued)

OTHER PUBLICATIONS

First Examination for IN patent application 201941013527, dated May 27, 2021, 6 pages.
(Continued)

*Primary Examiner* — Matthew W Genack
(74) *Attorney, Agent, or Firm* — Kowert, Hood, Munyon, Rankin & Goetzel, P.C.

(57) ABSTRACT

Embodiments are presented herein of apparatuses, systems, and methods for a user equipment device (UE) to adaptively manage system information, particularly on-demand system information. A UE may receive mandatory system information from a wireless network and may determine that at least some additional, e.g., on-demand, system information would be beneficial. The UE may evaluate whether a condition is met to request the additional system information and may initiate a random access procedure to request the additional system information. If the random access procedure fails, the UE may adjust its behavior, including reselection behavior, in response to lacking the additional system information.

20 Claims, 14 Drawing Sheets

(51) Int. Cl.
  *H04W 48/10* (2009.01)
  *H04W 36/30* (2009.01)
  *H04W 36/08* (2009.01)
  *H04W 74/08* (2009.01)
  *H04W 36/14* (2009.01)
  *H04W 48/02* (2009.01)
  *H04W 4/90* (2018.01)
  *H04W 36/32* (2009.01)
  *H04W 36/34* (2009.01)

(52) U.S. Cl.
  CPC ......... *H04W 36/305* (2018.08); *H04W 36/32* (2013.01); *H04W 36/34* (2013.01); *H04W 48/02* (2013.01); *H04W 48/10* (2013.01); *H04W 74/0833* (2013.01)

(58) Field of Classification Search
  USPC ........... 455/434, 435.1–435.3, 436–444, 466
  See application file for complete search history.

(56) References Cited

U.S. PATENT DOCUMENTS

| | | | |
|---|---|---|---|
| 2015/0319662 A1* | 11/2015 | Enomoto | H04W 48/18 370/338 |
| 2016/0234735 A1 | 8/2016 | Kubota et al. | |
| 2016/0234736 A1* | 8/2016 | Kubota | H04B 7/0413 |
| 2017/0111886 A1* | 4/2017 | Kim | H04W 48/14 |
| 2017/0311276 A1 | 10/2017 | Tsai | |
| 2017/0331670 A1 | 11/2017 | Parkvall | |
| 2018/0007733 A1* | 1/2018 | Mochizuki | H04W 76/19 |
| 2018/0132168 A1 | 5/2018 | Ingale | |
| 2018/0199266 A1 | 7/2018 | Pantelidou | |
| 2018/0324022 A1 | 11/2018 | Sheng | |
| 2018/0324679 A1 | 11/2018 | Basu Mallick | |
| 2018/0338277 A1* | 11/2018 | Byun | H04W 74/0833 |
| 2019/0174554 A1* | 6/2019 | Deenoo | H04W 16/14 |
| 2019/0306784 A1* | 10/2019 | Chen | H04W 36/305 |
| 2020/0214018 A1* | 7/2020 | Venugopal | H04L 5/1461 |
| 2020/0267629 A1* | 8/2020 | Van Der Velde | H04W 48/14 |

FOREIGN PATENT DOCUMENTS

| | | |
|---|---|---|
| WO | WO2017197063 A1 | 11/2017 |
| WO | 2018016922 A1 | 1/2018 |
| WO | WO2018093939 A1 | 5/2018 |
| WO | 2018171746 A1 | 9/2018 |
| WO | 2018204863 A1 | 11/2018 |

OTHER PUBLICATIONS

Office Action for German Patent Application No. DE 10 2020 204 375.2, dated Jun. 28, 2021.

* cited by examiner

ON DEMAND SYSTEM INFORMATION BLOCK ACQUISITION

PRIORITY INFORMATION

This application claims priority to Indian patent application serial number 201941013527, entitled "On Demand System Information Block Acquisition," filed Apr. 3, 2019, which is hereby incorporated by reference in its entirety as though fully and completely set forth herein.

TECHNICAL FIELD

The present application relates to wireless devices, and more particularly to apparatuses, systems, and methods for acquiring on demand system information.

DESCRIPTION OF THE RELATED ART

Wireless communication systems are rapidly growing in usage. Wireless devices, particularly wireless user equipment devices (UEs), have become widespread. Additionally, there are a variety of applications (or apps) hosted on UEs that perform or depend on wireless communication, such as applications that provide messaging, email, browsing, video streaming, short video, voice streaming, real-time gaming, or various other online services.

In some instances, for example in 5G new radio (NR), some system information is periodically broadcast by a cellular network while other system information is available on request. However, it may be up to an individual UE to determine when to request the on-demand system information. Further, communication failures (e.g., of a random access channel) may interfere with such a request for on-demand system information and it may be up to an individual UE to determine how to overcome such a problem. Thus, improvements in the field are desirable.

SUMMARY

Techniques are disclosed for a user equipment (UE) device to acquire on-demand system information. The UE may comprise at least one antenna for performing wireless communications, a radio coupled to the at least one antenna, and a processing element coupled to the radio, and may be configured to communicate in a wireless fashion with a wireless (e.g., cellular) network via at least one type of radio access technology (RAT).

In some embodiments, a UE may initiate wireless circuitry and receive at least some system information, e.g., from a 5G new radio (NR) cellular network. The UE may determine that additional system information, e.g., on demand system information, would provide a benefit to the UE. Following such a determination, the UE may determine whether one or more conditions is met to request additional system information. When (or if) such conditions are met, the UE may transmit a request for the additional system information. The UE may receive the additional system information.

In some embodiments, if a communication failure (e.g., of a random access procedure used to request the additional system information), the UE may consider one or more rules for responding to the failure. Such rules may consider various factors including the nature of the additional system information and whether or not the UE has valid copies of the additional system information. Based on the circumstances and the consideration of the decision rules, the UE may adjust one or more of its behaviors, e.g., related to selection of cells and/or RATs.

In some embodiments, based on a determination that certain types of system information are configured as on-demand system information, the UE may blacklist (at least temporarily) one or more cells.

In some embodiments, a non-transitory memory medium may include program instructions executable by a UE that, when executed, cause the UE to perform at least a portion or all of the above operations. In some embodiments, a method performed by the UE may include the UE performing the above operations. In some embodiments, a method performed by a base station or network element may include the base station or network element performing corresponding operations.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the disclosed embodiments can be obtained when the following detailed description is considered in conjunction with the following drawings, in which.

Figure 1:
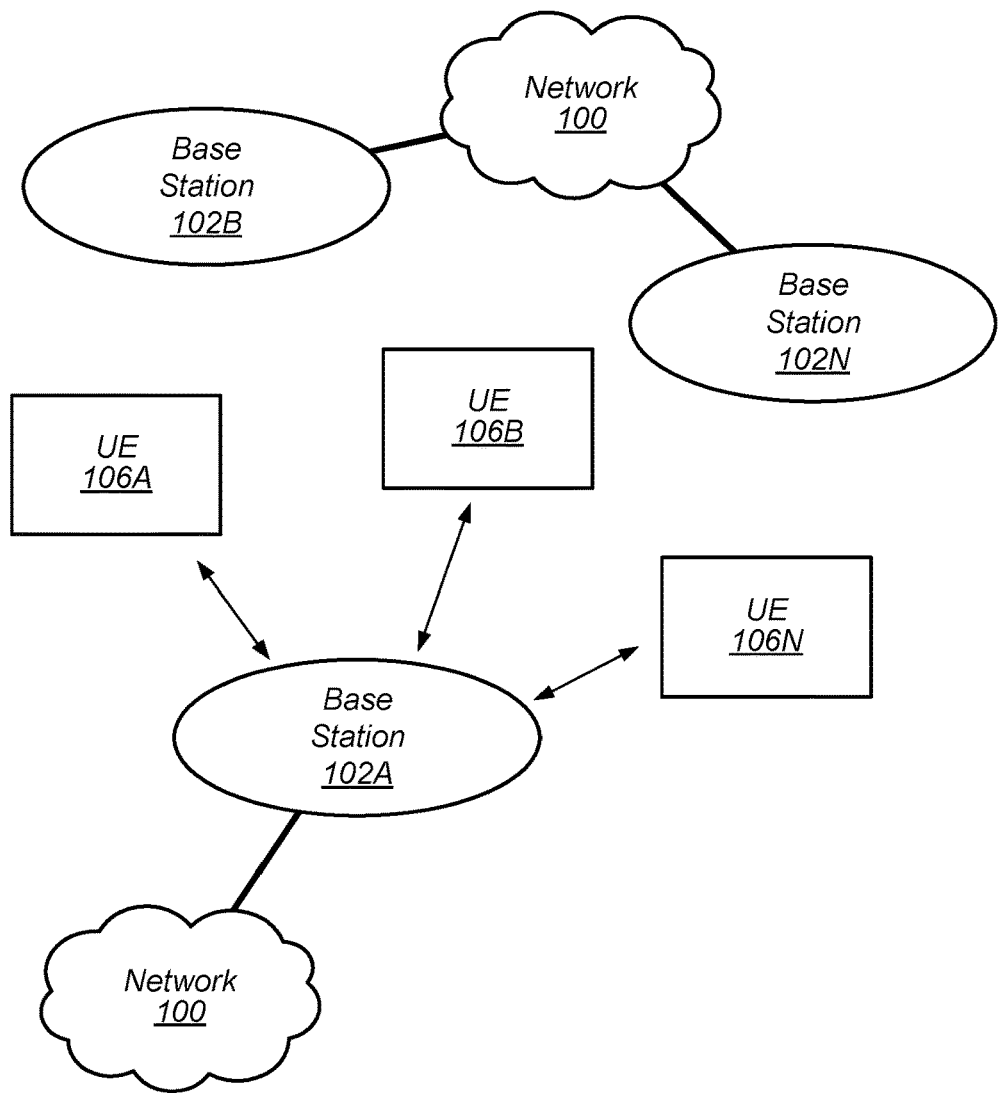
FIG. 1 illustrates an example wireless communication system, according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms are used in the present Patent Application:
UE: User Equipment
BS: Base Station
ENB: eNodeB (Base Station)
LTE: Long Term Evolution
UMTS: Universal Mobile Telecommunications System
RAT: Radio Access Technology
RAN: Radio Access Network
E-UTRAN: Evolved UMTS Terrestrial RAN
CN: Core Network
EPC: Evolved Packet Core
MME: Mobile Management Entity
HSS: Home Subscriber Server
SGW: Serving Gateway
PS: Packet-Switched
CS: Circuit-Switched
EPS: Evolved Packet-Switched System
RRC: Radio Resource Control
IE: Information Element
QoS: Quality of Service
QoE: Quality of Experience
TFT: Traffic Flow Template
RSVP: Resource ReSerVation Protocol
API: Application programming interface

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, wearable devices (such as a smart watch), or other handheld devices, etc. In general, the term "UE" or "UE device" can be broadly defined to encompass any electronic, computing, and/or telecommunications device (or combination of devices) which is capable of wireless communication. UE devices may commonly be mobile or portable and easily transported by a user, though in some cases substantially stationary devices may also be configured to perform wireless communication.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Figure 2:
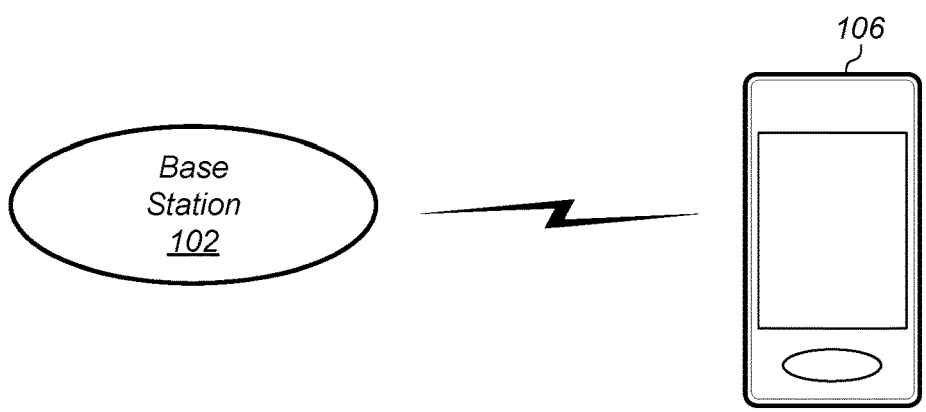
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102 which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102 may be a base transceiver station (BTS) or cell site (a "cellular base station"), and may include hardware that enables wireless communication with the UEs 106A through 106N.

The communication area (or coverage area) of the base station may be referred to as a "cell." The base station 102 and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1xRTT, 1xEV-DO, HRPD, eHRPD), etc. Note that if the base station 102 is implemented in the context of LTE, it may alternately be referred to as an 'eNodeB' or 'eNB'. Note that if the base station 102 is implemented in the context of 5G NR, it may alternately be referred to as gNodeB' or gNB'.

As shown, the base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. In particular, the cellular base station 102 may provide UEs 106 with various telecommunication capabilities, such as voice, SMS and/or data services.

Base station 102 and other similar base stations operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations 102B-N), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

In some embodiments, base station 102 may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
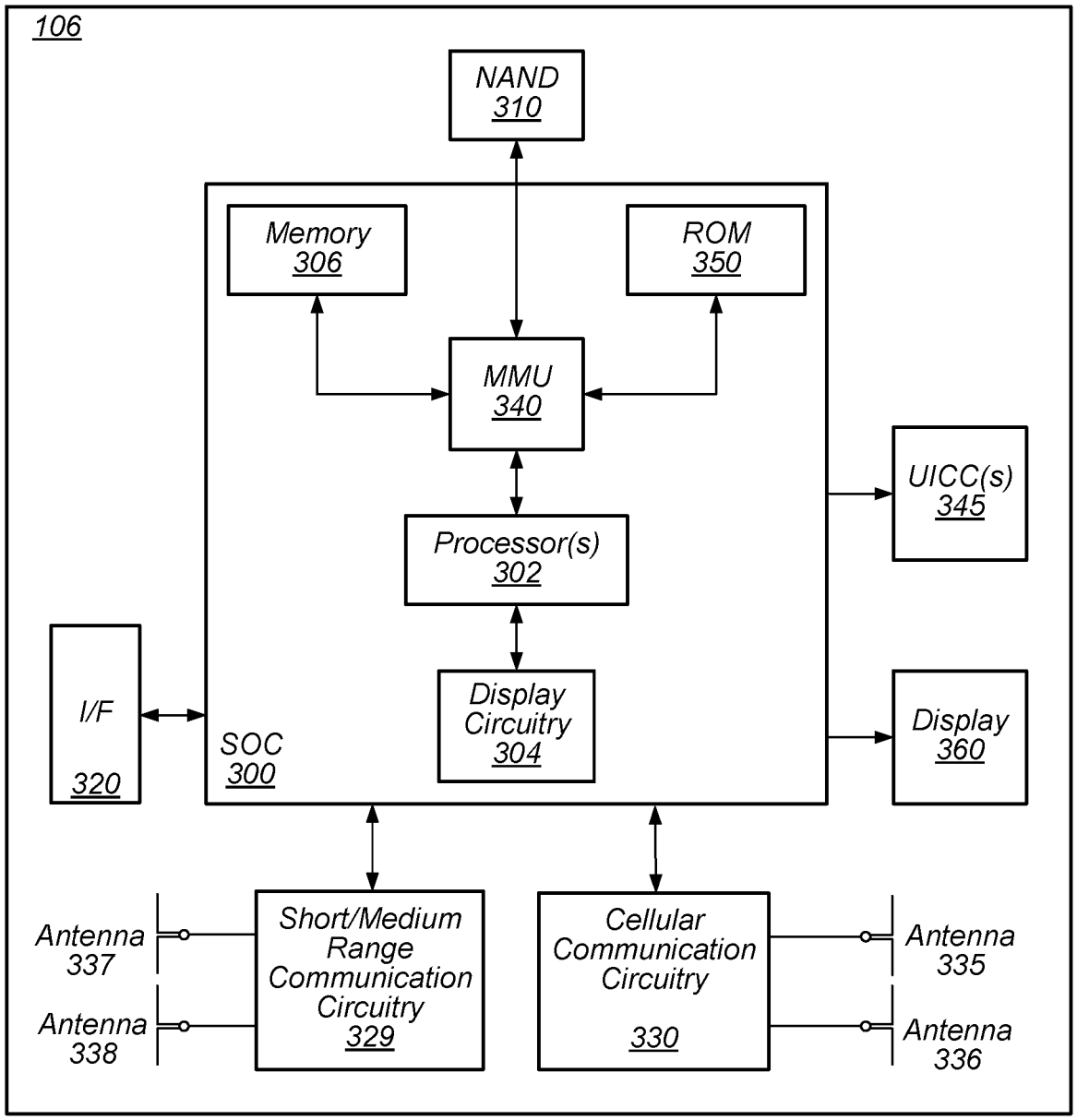
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector OF 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity (DC) with the first and second network nodes has been established.

As described herein, the communication device 106 may include hardware and software components for implementing features for using multiplexing to perform transmissions according to multiple radio access technologies in the same frequency carrier (e.g., and/or multiple frequency carriers), as well as the various other techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements and/or processors. In other words, one or more processing elements/processors may be included in cellular communication circuitry 330 and, similarly, one or more processing elements/processors may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short range wireless communication circuitry 329 may include one or more ICs that are configured to perform the functions of short range wireless communication circuitry 329. In addition, each integrated circuit may include circuitry (e.g., first circuitry, second circuitry, etc.) configured to perform the functions of short range wireless communication circuitry 329.

Figure 4:
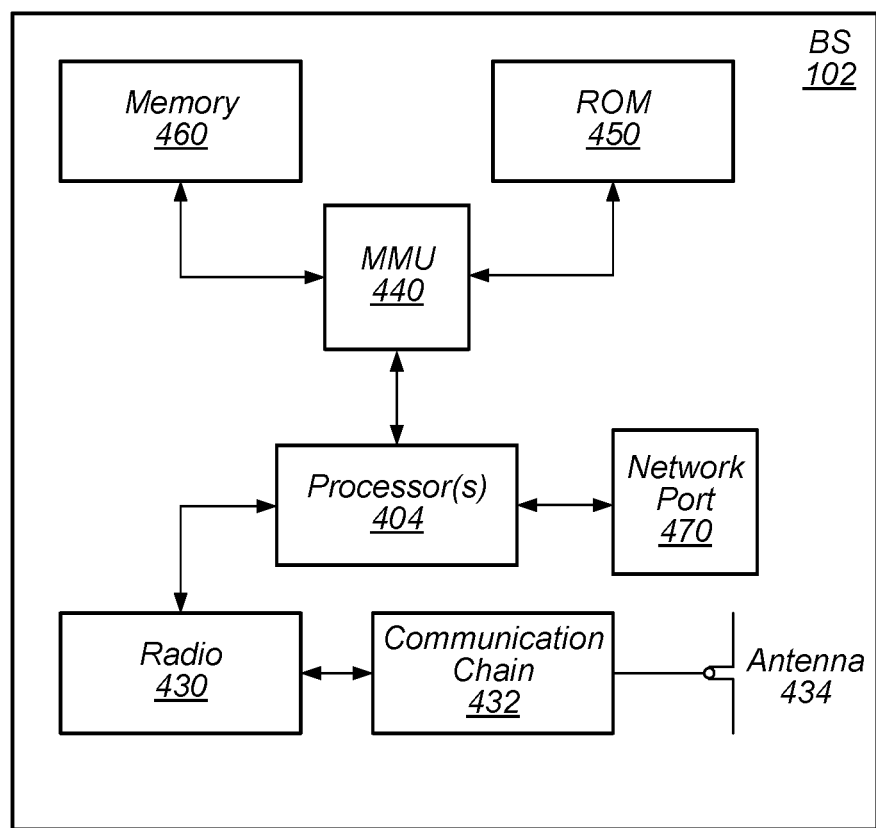
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 434, and possibly multiple antennas. The radio 430 and at least one antenna 434 may be configured to operate as a wireless transceiver and may be further configured to communicate with UE devices 106. The antenna 434 may communicate with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
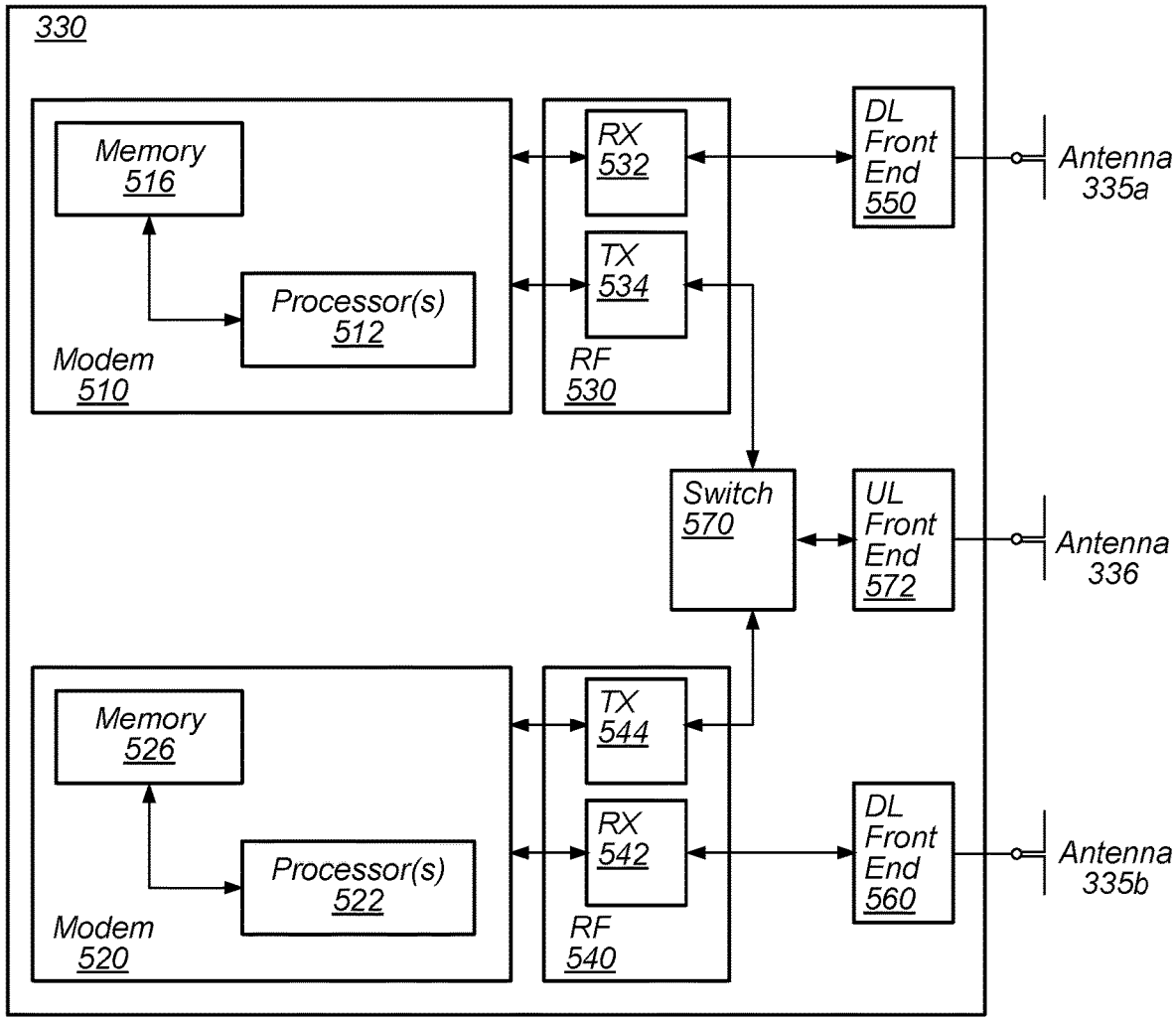
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, are also possible. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to transmit, via the first modem while the switch is in the first state, a request to attach to a first network node operating according to the first RAT and transmit, via the first modem while the switch is in a first state, an indication that the wireless device is capable of maintaining substantially concurrent connections with the first network node and a second network node that operates according to the second RAT. The wireless device may also be configured transmit, via the second radio while the switch is in a second state, a request to attach to the second network node. The request may include an indication that the wireless device is capable of maintaining substantially concurrent connections with the first and second network nodes. Further, the wireless device may be configured to receive, via the first radio, an indication that dual connectivity with the first and second network nodes has been established.

As described herein, the modem 510 may include hardware and software components for implementing features for using multiplexing to perform transmissions according to multiple radio access technologies in the same frequency carrier, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In some embodiments, processor(s) 512, 522, etc. may be configured to implement or support implementation of part or all of the methods described herein, e.g., by executing program instructions stored on a memory medium (e.g., a non-transitory computer-readable memory medium). Alternatively, the processor(s) 512, 522, etc. may be configured as a programmable hardware element, such as an FPGA, or as an ASIC, or a combination thereof. In addition, as described herein, processor(s) 512, 522, etc. may include one or more processing elements. Thus, processor(s) 512, 522, etc. may include one or more integrated circuits (ICs) that are configured to perform the functions of processor(s) 512, 522, etc. In addition, each integrated circuit may include circuitry (e.g., first circuitry, second circuitry, etc.) configured to perform the functions of processor(s) 512, 522, etc.

As described herein, the modem 520 may include hardware and software components for implementing features for using multiplexing to perform transmissions according to multiple radio access technologies in the same frequency carrier, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

Figure 6:
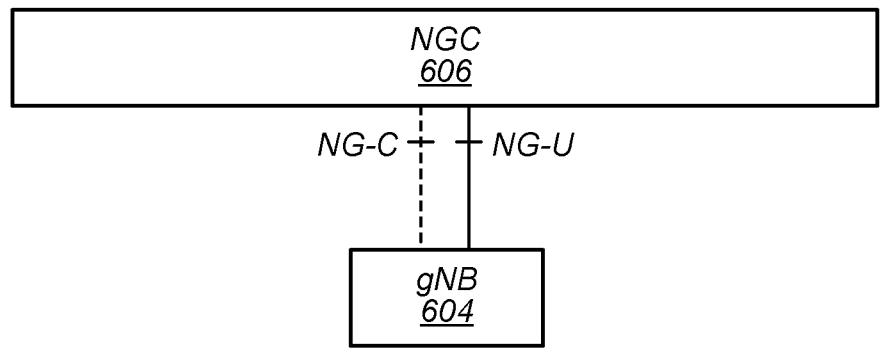
FIGS. 6 and 7 illustrate examples of a 5G NR base station (gNB), according to some embodiments.
Figure 7:
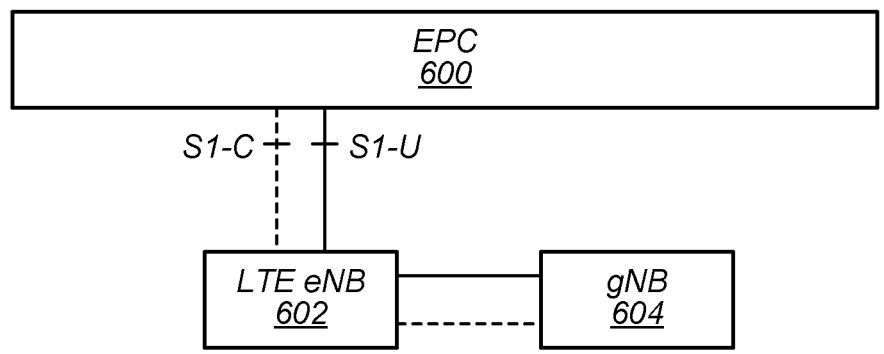

FIGS. 6-7—5G NR Architecture

In some implementations, fifth generation (5G) wireless communication will initially be deployed concurrently with other wireless communication standards (e.g., LTE). For example, whereas FIG. 6 illustrates a possible standalone (SA) implementation of a next generation core (NGC) network 606 and 5G NR base station (e.g., gNB 604), dual connectivity between LTE and 5G new radio (5G NR or NR), such as in accordance with the exemplary non-standalone (NSA) architecture illustrated in FIG. 7, has been specified as part of the initial deployment of NR. Thus, as illustrated in FIG. 7, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. In some instances, the gNB 604 may also have at least a user plane reference point with EPC network 600. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services. As will be appreciated, numerous other non-standalone architecture variants are possible.

Figure 8:
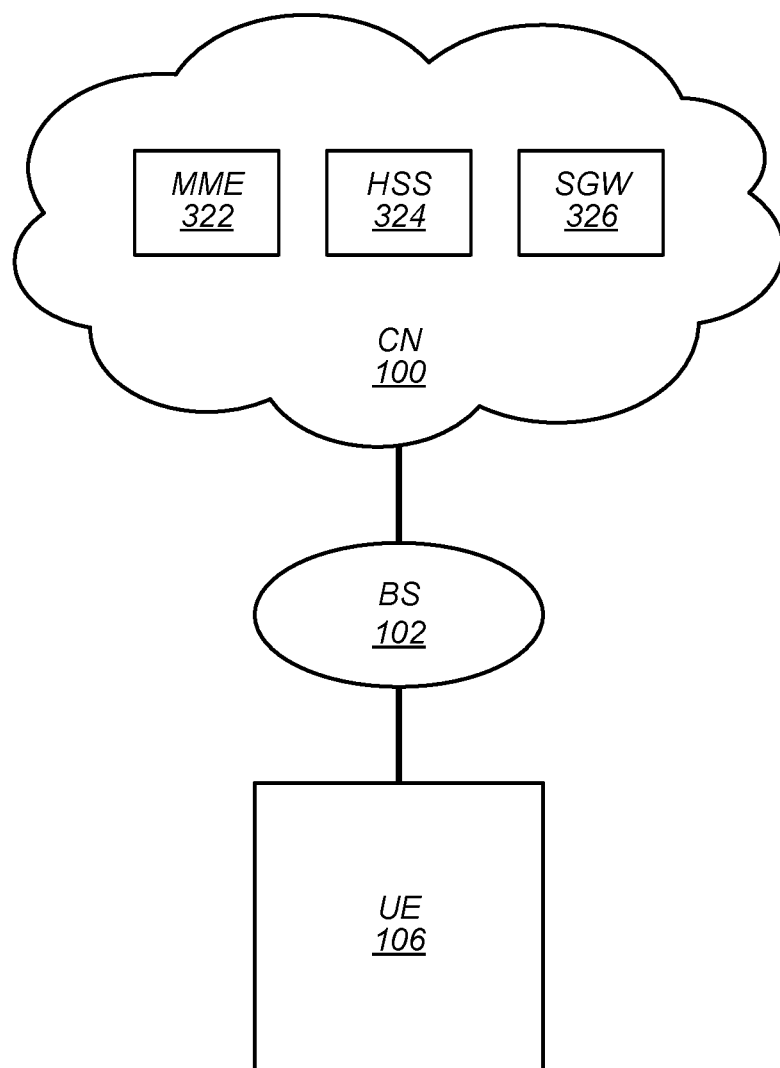
FIG. 8 illustrates an exemplary wireless network in communication with a UE, according to some embodiments.

FIG. 8—Wireless Communication System

FIG. 8 illustrates an example simplified portion of a wireless communication system. The UE 106 may be in communication with a wireless network, e.g., a radio access network (RAN), which may include one or more base stations (BS) 102 and may provide connection to a core network (CN) 100, such as an evolved packet core (EPC). The base station 102 may be an eNodeB and/or gNB (e.g., a 5G or NR base station) or other type of base station. The UE 106 may communicate in a wireless manner with the base station 102. In turn, the base station 102 may be coupled to a core network 100. As shown, the CN 100 may include a mobility management entity (MME) 322, a home subscriber server (HSS) 324, and a serving gateway (SGW) 326. The CN 100 may also include various other devices known to those in the art.

Operations described herein as being performed by the wireless network may be performed by one or more of the network devices shown in FIG. 8, such as one or more of the base station 102 or the CN 100, and/or the MME 322, HSS 324, or SGW 326 in the CN 100, among other possible devices. Operations described herein as being performed by the radio access network (RAN) may be performed, for example, by the base station 102, or by other components of the RAN usable to connect the UE and the CN.

Figure 9:
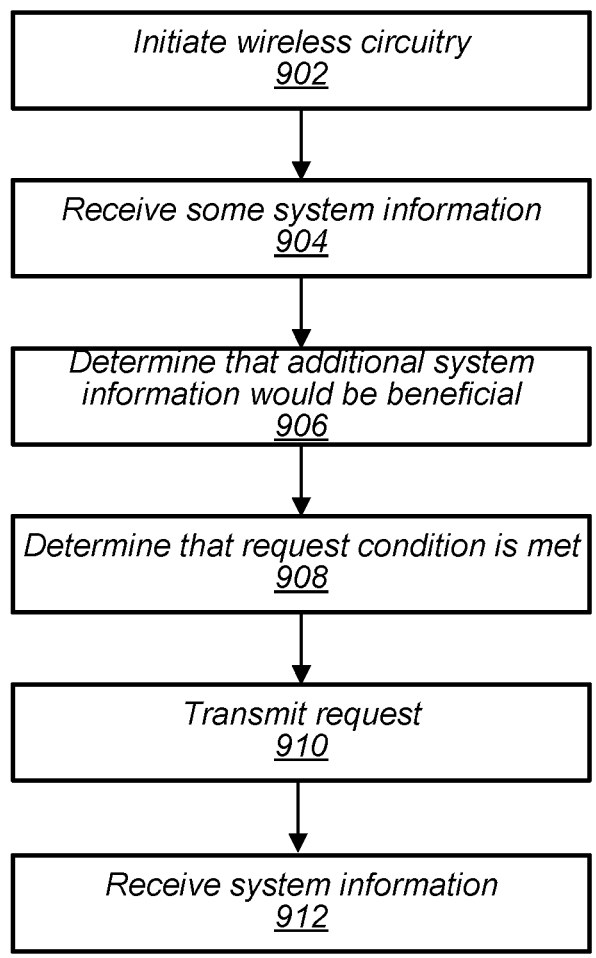
FIG. 9 is a flow chart diagram illustrating an example method for requesting on-demand system information (SI), according to some embodiments.

FIG. 9—Opportunistic Acquisition of On-Demand System Information (SI)

In LTE networks, the network (NW) may be configured to broadcast all system information (SI) periodically. For example, all SI blocks (SIBs) (e.g., SIB type 1 (SIB1)-SIB16, etc.), and the master information block (MIB) may be routinely broadcast. The schedule for broadcasting the various SIBs and MIB may vary from information block to information block, between networks, between cells, over time, etc.

However, in 5G NR networks, SI may be divided into three categories: mandatory (e.g., MIB and SIB1), periodic, and on-demand. 5G networks may periodically broadcast the mandatory SI blocks (SIBs). The mandatory SI may include basic information, such as identity of the NW (e.g., public land mobile network), bands used for communication, location of periodic SIBs, etc. For example, SIB1 may include information on which other Ms are regularly broadcast (e.g., the periodic SIBs) and which other Ms are transmitted upon request by a UE (e.g., the on-demand SIBs).

In other words, the minimum (e.g., mandatory) SI, e.g., MIB and SIB1, may include the information used for initial access and information for acquiring any other SI. The other SI includes information that may be periodically broadcast (e.g., on a downlink (DL) shared channel (SCH)) or is broadcast on demand (e.g., on a DL-SCH, e.g., to idle or inactive UEs). Further, on-demand SI may be sent in a dedicated manner (e.g., on a DL-SCH) to UEs in RRC_CONNECTED.

To acquire the on-demand SI (e.g., SIBs), a UE (e.g., in a radio resource control (RRC) idle or inactive mode, e.g., RRC_IDLE or RRC_INACTIVE) may be configured to trigger a lower layer to initiate a preamble transmission procedure (e.g., a random access channel (RACH) procedure) to request any or all of the on-demand Ms. In one embodiment, the on-demand SIBs to be requested may be indicated in the RACH procedure, e.g., using a bit map to indicate which SIBs are requested. The UE may be configured to receive the requested SI when an acknowledgement of the request is received (e.g., immediately following the acknowledgement, at a configured time following the acknowledgement, or as otherwise scheduled by the NW).

A UE may be configured to request the on-demand SI according to any desired implementation. One consideration in selecting such an implementation is a tradeoff between the benefit of having the latest SI vs. the cost (e.g., in terms of battery power and other resources) associated with the request (e.g., RACH) procedure. For example, it may be desirable to balance the benefit of up-to-date SIBs as well as avoiding trying to acquire on-demand SIBs multiple times.

Accordingly, improved methods for determining when to request on-demand SI may be desired. FIG. 9 illustrates exemplary techniques for requesting on-demand SI. Aspects of the method of FIG. 9 may be implemented by a wireless device, such as the UE(s) 106, in communication with one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 402, baseband processor(s), processor(s) associated with communication circuitry, etc., among various possibilities) may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

The UE (e.g., UE 106) may initiate its wireless (e.g., cellular) circuitry (902). This initiation may be associated with powering on the device or exiting airplane mode, among various possibilities.

The UE may receive first SI (904). This SI may be detected upon initiation of the wireless circuitry. Similarly, the UE may detect viable wireless (e.g., cellular) service following a time of being out-of-service (OOS), and may receive some SI associated with that wireless service.

The first SI may be the mandatory SI of a 5G NR network. For example, the SI may be received in a MIB and/or SIB1, among various possibilities.

In some embodiments, the UE may also receive some periodic SI. For example, in addition to the mandatory SI the UE may receive one or more SIBs that are periodically broadcast by the network. Similarly, the UE may request and possibly receive some on-demand SI. In other words, the first SI may include only the mandatory SI and may possibly further include some periodic and/or on-demand SI.

The UE may determine that additional SI would be beneficial (906). For example, the UE may determine that some (e.g., additional or updated) on-demand SI would assist the UE. The additional SI may or may not be urgent.

For example, if the UE does not have a valid copy of one or more Ms that pertain to cell reselection (e.g., SIBSs 2-5, among various possibilities), the UE may determine that a valid copy of such SIB(s) would assist the UE, e.g., in order to perform cell reselection and/or associated measurements. In some embodiments, unless the UE is experiencing poor conditions (e.g., beam failures, etc.) related to the connection with the wireless network, SI related to reselection may not be urgent. If the connection is poor, then the SI related to reselection may be considered relatively urgent.

Similarly, if global navigational satellite system (GNSS, e.g., global positioning system (GPS)) activity is detected on the UE, the UE may determine that SIB16 (e.g., which may contain information relevant to GNSS, location, etc.) may assist the device in determining location.

The UE may determine that a request condition is met (908). In other words, based on determining that one (or more) request condition is satisfied, the UE may determine to transmit a request for the additional SI (e.g., that was determined to be beneficial in 906). The request condition may be met at the same time as the determination that additional SI would be beneficial, or at a different (e.g., later time). In other words, the determination of 906 may occur at a first time, and the determination of 908 may occur at a second time. The second time may be the same or different as the first time.

In some embodiments, the request condition may be based on determination of urgency for reselection. For example, if the UE has recently experienced beam failures above a threshold frequency (e.g., more than a threshold number of beam failures within a specified time window, etc.), then the UE may determine that a request condition is met. In other words, the rate of beam failures exceeding the threshold rate may indicate that the connection with the serving cell is relatively poor and that reselection is appropriate. Thus, the SI may be considered urgent. Accordingly, the UE may determine to transmit a request for on-demand SI that includes cell reselection information (e.g., SIBs 3 and 4, among various possibilities). In some embodiments, in such a scenario, the UE may elect to request only the most critical on-demand SIBs for reselection, e.g., in order to expedite reception of the reselection information.

It should be noted that frequency of beam failures is only one example of request conditions based on urgency of reselection. Other examples may include, but are not limited to comparing one or more of various measurements (e.g., signal strength, signal quality, SNR, SINR, bit or block error rates, retransmission rates, etc.) to one or more corresponding thresholds (e.g., if RSRP is below a threshold and/or an error rate is above a threshold, the reselection urgency may be considered high and thus a request criteria may be met, etc.).

In some embodiments, the request condition may be based on the wireless communication status of the UE. In other words, a request condition may be satisfied if an opportunity to piggyback (e.g., coordinate) the request with another activity occurs. For example, a (e.g., idle) UE may determine that a request condition is satisfied if there is data traffic initiated by the UE (e.g., by an application processor of the UE). Thus, the UE may use the same RACH procedure to both request the additional SI and to transition from RRC_IDLE to RRC_CONNECTED to perform the data transfer. Similarly, if there is a non-access stratum (NAS) signaling procedure (e.g., IMS registration, IMS refresh, etc.) initiated when the UE is RRC_IDLE, the UE may determine that a request condition is satisfied. The UE may use the same RACH procedure to both request the additional SI and to transition from RRC_IDLE to RRC_CONNECTED to perform the NAS signaling procedure. In both cases, the UE may select to request all on-demand SIBs (e.g., because there may be little or no additional power cost associated with requesting all of the on-demand SIBs, since a RACH procedure may occur to support the other activity). Similarly, other activities that may include a RACH procedure may be the basis for satisfying a request criterion.

In some embodiments, the request condition may be based on the reason that the additional SI would be beneficial. In other words, in some scenarios, SI may be determined to be sufficiently urgent to justify the energy cost of performing the request procedure without waiting for an opportunity to piggyback the request with another activity (e.g., RACH procedure). For example, in response to GPS (or other GNSS) activity, the UE may determine that a request condition is met. In such a case, the UE may determine to request all on-demand SI at once, e.g., in addition to SIB16 (or other SI directly relevant to the GNSS activity). In other words, requests for other SI may be piggybacked with the request.

In some embodiments, the UE may determine to perform a reselection while waiting for a request criterion to be satisfied. The UE may evaluate one or more reselection criteria (including preliminary reselection criteria) and may perform a reselection if such criteria are satisfied. Such a reselection may change what SI is available and/or lacking for the UE, and may thus change a determination of what (if any) additional SI would be beneficial.

It will be appreciated that in some embodiments, the determinations of 906 and 908 may be performed separately (as illustrated), but in other embodiments the UE may make a single determination covering both conditions, e.g., a determination that one or more conditions is satisfied to request additional SI.

The UE may transmit a request for additional SI (910). For example, the UE may initiate a RACH procedure that includes a request for some or all on-demand SIBs. The request may specify specific SIBs and/or may request all on-demand SIBs, e.g., as discussed in 908. The RACH procedure may also perform other functions (e.g., changing to RRC_CONNECTED mode).

The UE may determine whether or not the request (e.g., RACH procedure) has failed. In some embodiments, if the request procedure has failed, the UE may proceed to the method of FIG. 11.

If the request procedure is successful, the UE may receive the requested additional SI (912). The UE may store this SI. In some embodiments, the UE may not attempt to re-acquire this SI for a threshold period of time (e.g., a significant period of time such as 3 hours, among various possibilities).

The UE may use the received, additional SI. For example, the UE may use the received SI to reselect to another cell, network, RAT, etc., and/or to perform GNSS related functions, measurements, or calculations such as determining a location of the UE.

In some embodiments, if the UE is no longer camped on the same cell, the SI may be discarded and a new request for the SI may be initiated. For example, the UE may return to 906 in response to a reselection.

Figure 10:
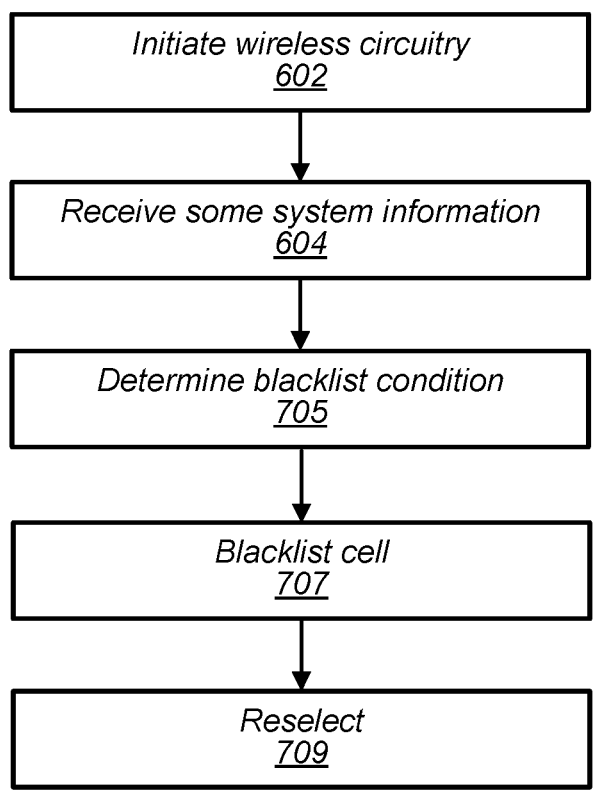
FIG. 10 is a flow chart diagram illustrating an example method of blacklisting based on configuration of on-demand system information (SI), according to some embodiments.

FIG. 10—Blacklisting Based on Configuration of On-Demand System Information (SI)

As noted above, in 5G NR networks, a NW may be able to determine what types of SI should be available on-demand. Some networks designate that SIBs relating to commercial mobile alert system (CMAS) and/or earthquake and tsunami warning system (ETWS) are available on-demand. Such networks may not periodically broadcast these SIBS. Such a configuration may be hazardous to the user of a UE device, e.g., because the UE (and thus the user) may not receive such alerts promptly.

Accordingly, improved methods for blacklisting cells with such a configuration may be desired. FIG. 10 illustrates exemplary techniques for blacklisting such cells, according to some embodiments. Aspects of the method of FIG. 10 may be implemented by a wireless device, such as the UE(s) 106, in communication with one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 402, baseband processor(s), processor(s) associated with communication circuitry, etc., among various possibilities) may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

The UE may initiate wireless circuitry (1002), e.g., as described above with respect to 902.

The UE may receive some SI (1004), e.g., as described above with respect to 904.

Based on the received SI, the UE may determine that a blacklist condition is met (1005). For example, the UE may determine that a configuration of the cell and/or network may delay the provision of a safety alert. For example, one or more SIB types that are associated with CMAS and/or ETWS may be configured as on-demand SI. As discussed above, such a configuration may be hazardous.

Based on determining that a blacklist condition is met, the UE may blacklist one or more cells (1007). For example, the UE may blacklist one or more cells that are configured in a way that may potentially delay the provision of a safety alert, e.g., by configuring such SIBs as on-demand SI. The UE may blacklist such a cell (or cells) for any period of time, e.g., 3 hours.

Based on blacklisting the cell(s), the UE may reselect to a different cell, RAT, or network, if needed (1009). The UE may use any relevant and available SI (e.g., about neighbor cells, etc.) and may take measurements as needed to perform such reselection.

Figure 11:
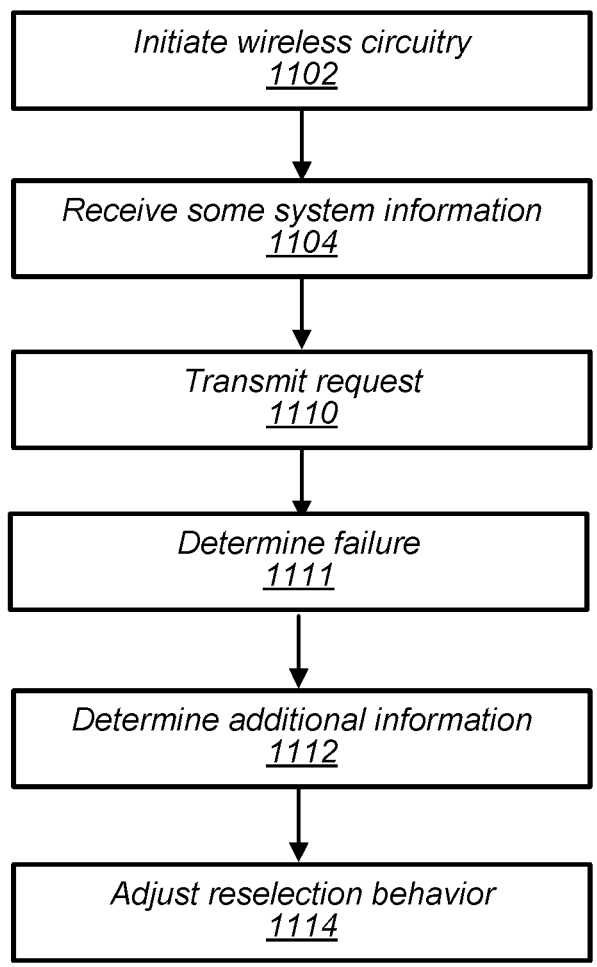
FIG. 11 is a flow chart diagram illustrating an example method for handling failure of a request for on-demand system information, according to some embodiments.

FIG. 11—Handling Failure of a Request for On-Demand System Information (SI)

As noted above, in 5G NR networks, a NW may be able to designate that some types of SI should be available on-demand. A UE may request such on-demand SI, e.g., using a RACH procedure. Such a request procedure may fail at some times and/or under some conditions. In the event of a failure, the UE may be left without the requested SI for at least a period of time. It may be up to the UE to determine how to overcome this problem, e.g., how to proceed following such a failure. For example, 3GPP TS 38.331, section 5.2.2.3.3 and 3GPP TS 38.330, section 7.3.2 may not specify how to respond to a SI request failure.

Accordingly, improved methods for responding to such failures may be desired. FIG. 11 illustrates exemplary techniques for handling a SI request failure, according to some embodiments. Aspects of the method of FIG. 11 may be implemented by a wireless device, such as the UE(s) 106, in communication with one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 402, baseband processor(s), processor(s) associated with communication circuitry, etc., among various possibilities) may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

The UE may initiate wireless circuitry (1102), e.g., as described above with respect to 902.

The UE may receive some SI (1104), e.g., as described above with respect to 904.

The UE may transmit a request for additional SI (1110), e.g., as described above with respect to 910. It should be noted that, although the method of FIG. 11 may be performed in conjunction with the method of FIG. 9, that this relation is not required. Thus, the UE may or may not perform any function similar to 906 and/or 908 as discussed above.

The UE may determine a failure of the request for additional SI (1111), according to some embodiments. For example, the UE may detect a failure of a random access (e.g., RACH) procedure associated with the request for additional SI.

The UE may further determine additional facts related to the SI stored the UE (1112), according to some embodiments. For example, the UE may determine what type(s) of SI was requested and/or what type of SI was not received. Similarly, the UE may determine whether or not it has a valid copy of any or all of the SI that was requested but not received. In other words, the UE may determine what specific SI it lacks.

Based on the determination(s) about SI stored by the UE, the UE may adjust its reselection behavior (1114), according to some embodiments.

In response to a determination that the UE has a valid copy of the requested SI, the UE may delay the request for SI. The UE may delay the request until expiration of the SI (e.g., 3 hours after it was last received, among various possibilities). The UE may delay the request until it reselects to another (e.g., better) cell. The UE may delay the request until a request condition is met (e.g., as discussed above with respect to 908), such as an opportunity to coordinate the request with another activity occurs.

Figure 15:
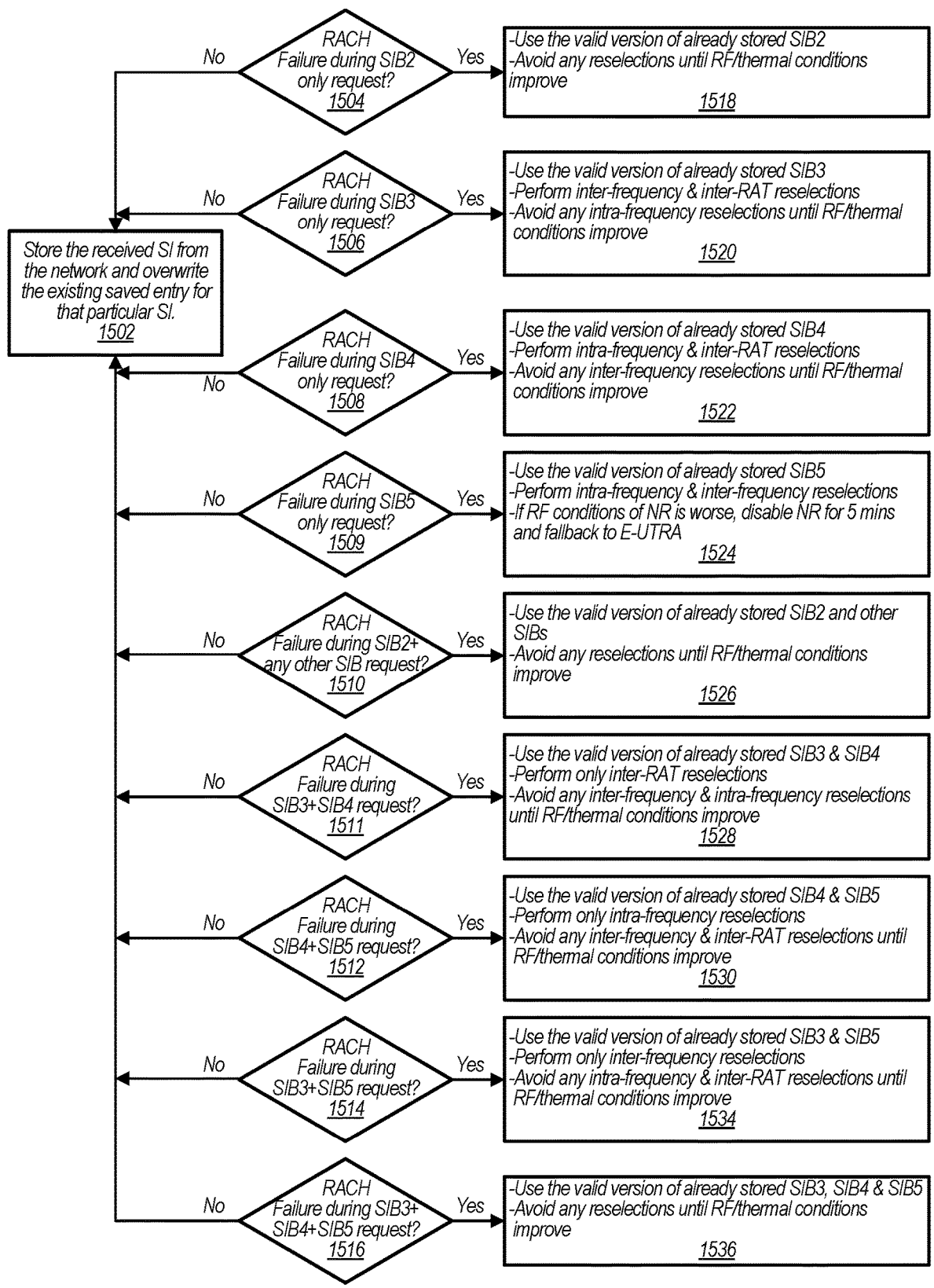

During the delay, the UE may adjust its reselection behavior, e.g., to compensate for the requested, but not received, SI, according to some embodiments. Broadly speaking, the UE may attempt to avoid the type(s) of reselection that would be assisted by the lacking SI, and may instead prefer other type(s) of reselection (e.g., which may not be the subject of the lacking SI). Several examples are illustrated in FIG. 15 and described below. In other words, the UE may avoid reselections associated with the requested additional SI and may (at least relatively) prefer reselections that do not correspond to the requested additional SI.

In response to a determination that the UE does not have a valid copy of the requested SI, the UE may reselect, e.g., in order camp on a cell with better conditions. The UE may reselect to a best alternative cell operating according to the same RAT (e.g., NR), e.g., even if it does not meet the otherwise applicable (e.g., s-criteria) conditions for such a reselection. In one embodiment, the UE may use different (e.g., lower) thresholds (or alter existing thresholds) for determining whether or not to reselect to the best alternative cell. For example, the UE may use a signal strength threshold (e.g., RSRP above −105 dBM, among various possibilities) and/or an SNR threshold (e.g., 5 dB, among various possibilities). The UE may determine not to reselect to the best alternative cell if such conditions are not met. If no cell of the same RAT meets such conditions, the UE may disable the RAT and may move to a different RAT (e.g., LTE, among various possibilities).

Figure 12:
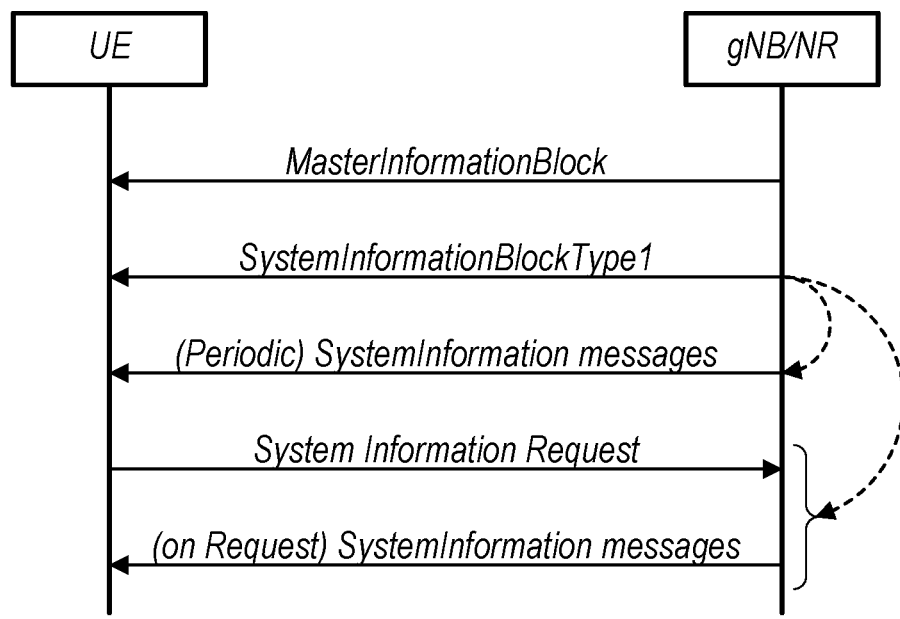
FIGS. 12, 13A, and 13B illustrate exemplary methods of SI acquisition, according to some embodiments.
Figure 13A:
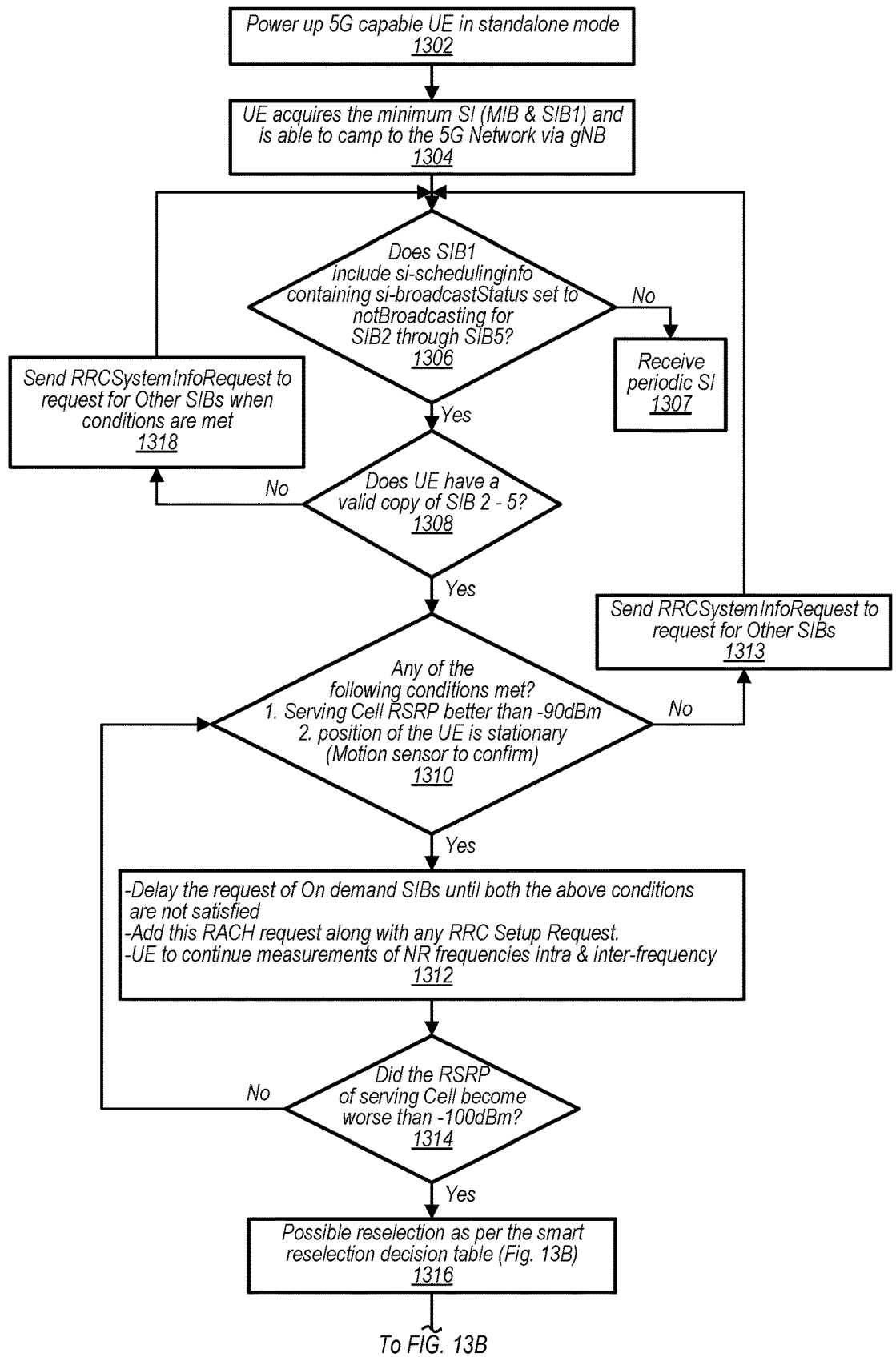
Figure 13B:

FIGS. 12, 13A, and 13B—Exemplary Method of SI Acquisition

FIG. 12 is a communication flow diagram illustrating an exemplary process of a UE acquiring at least some SI, according to some embodiments. A UE may receive a MIB from a base station. The UE may receive a SIB1 from the base station. The SIB1 may indicate which other SIBs are periodically broadcast (and on what time/frequency resources those broadcasts occur) and which SIBs are available on-request. The UE may receive the periodic SIBs in one or more messages. The UE may determine to request one or more on-demand SIBs and may transmit a SI request. The SI request may include a RACH procedure. The base station may receive the request and may transmit the requested SIBs to the UE.

FIG. 13A is a flow chart diagram illustrating an exemplary embodiment of the method of FIG. 9. A UE may be powered up (e.g., and/or may initiate its wireless circuitry, as in 902) (1302). The UE may initially operate in 5G NR standalone mode.

The UE may acquire the minimum (e.g., mandatory) SI (e.g., MIB and SIB1) and may camp on a 5G network via a base station (1304). It will be appreciated that the minimum SI may be acquired at any time, e.g., following boot up of the device, following a reselection, etc.

The UE may determine whether (and/or what) SI is available on request (1306). For example, the UE may determine whether the SIB1 includes a si-SchedulingInfo field containing a si-Broadcaststatus set to notBroadcasting for SIBs 2-5, e.g., an indication that the corresponding SI is on-demand.

If the relevant SI is not available on request (e.g., and is thus broadcast periodically by the network), the UE may receive the SI when it is broadcast (1307).

If any or all of SIBs 2-5 are available on request, the UE may determine whether or not it has a cached valid copy of such SIB(s) (1308).

If the UE does not have a valid copy, the UE may determine that additional SI would be beneficial (1318), e.g., as described in 906. Further, the UE may proceed to determine that a request condition is met (as described in 908) and transmit a request (as in 910). After the UE receives the requested information (as in 912), the method may return to 1306. If the UE does not receive the requested information, the method may proceed to the methods of FIG. 11 (e.g., 1111).

In response to a determination (e.g., in 1308) that the UE does have a valid copy of at least some of the SIBs 2-5, the UE may determine whether conditions are appropriate to delay the request of the on-demand SIB(s) (1310). For example, if either: 1) the signal strength (or other measurement) of the serving cell is better than a threshold and/or 2) the UE is stationary (or moving sufficiently slowly), then the UE may determine that delaying the request is appropriate. For example, the UE may use an RSRP threshold of −90 dBm and motion as determined by a motion sensor of the UE to test these conditions, among various possibilities. In other words, the UE may determine whether a request condition is met (e.g., as in 908), using the illustrated, exemplary conditions. It will be appreciated that the illustrated conditions are framed as negative request conditions, e.g., the request may be made (e.g., in 1313) if neither condition is met. In other words, if neither of the illustrated conditions (e.g., of 1310) is met, the request condition (e.g., of 908) may be met.

If either of the conditions (e.g., of 1310) is met, the UE may proceed to delay the request until both of the conditions are not meet (e.g., until neither of the conditions is met) (1312). Accordingly, the UE may wait to perform a RACH request along with any other RACH request (e.g., any RRC Setup Request). The UE may continue taking (e.g., periodic) inter and intra-frequency measurements, as well as measurements of other RATs and/or networks.

If the UE determines (e.g., based on periodic measurements) that the radio link conditions of the serving cell have deteriorated beyond a threshold (e.g., RSRP less than −100 dBm, in the illustrated example), the UE may determine that a preliminary reselection condition is met (e.g., regardless of the motion of the UE) (1314).

If a preliminary reselection condition is met, the UE may perform reselection according to the rules illustrated in the table of FIG. 13B (1316). Such reselection rules may be based on the on-demand system information currently cached by the UE. For example, the reselection conditions may be configured to account for the lack of SI available to the UE, e.g., the reselection rules may be different than rules applied when the UE has more complete SI (e.g., is not missing any of SIBs 2-5, among various possibilities). As shown, the UE may perform an intra-frequency reselection if a neighbor cell offers conditions (e.g., RSRP, among various possibilities) better than a first threshold (e.g., a first reselection condition is met). The UE may perform an inter-frequency reselection (within the same frequency band, FR1) if a neighbor cell offers conditions better than a second threshold. The UE may reselect to a different (e.g., higher) frequency band if the neighbor cell (operating in that band) offers conditions better than a third threshold.

In some embodiments, the reselection conditions illustrated in the table may be prioritized in the order described (e.g., intra-frequency reselection may be most preferred and reselection to the second frequency band may be least preferred).

In some embodiments, if none of the reselection conditions (other than the preliminary reselection condition) are met, the UE may not reselect and may continue to delay transmitting a request for the additional SI, e.g., until a request condition is met.

In some embodiments, if none of the reselection conditions (other than the preliminary reselection condition) are met, the UE may not reselect and may determine that a request condition is met, and may proceed to request the additional SI.

In some embodiments, if none of the reselection conditions (other than the preliminary reselection condition) are met, the UE may reselect to another RAT and/or network. The UE may apply additional reselection conditions prior to performing such a reselection. The additional reselection conditions may be the same or different than the illustrated reselection conditions of the table.

It will be appreciated that the illustrated conditions of FIGS. 13A and 13B are exemplary only, and that conditions using other values (e.g., of RSRP) and/or other measurements (e.g., SNR, etc.) may be used as desired.

Figure 14:
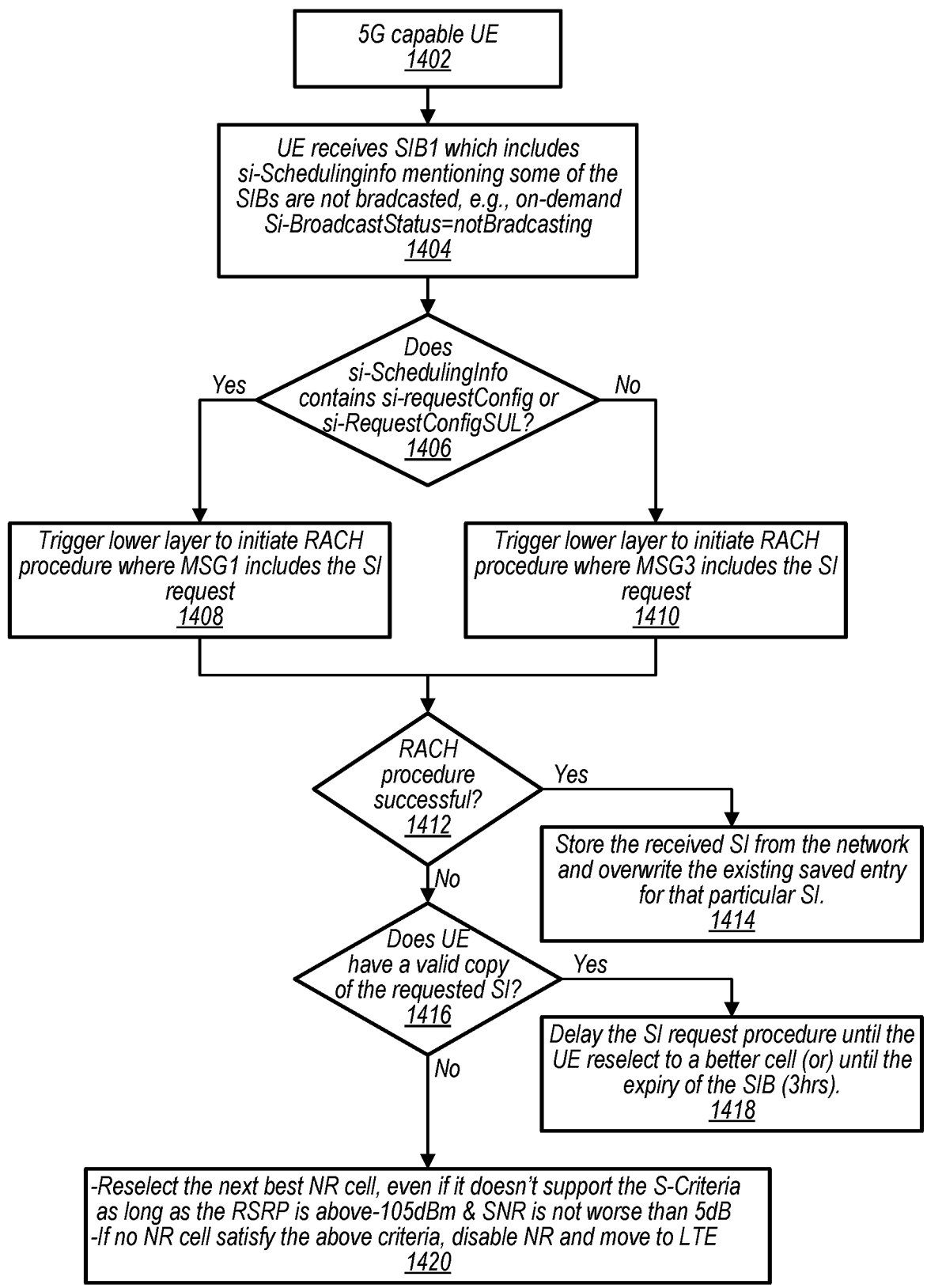
FIGS. 14 and 15 illustrate exemplary methods of responding to a failure, according to some embodiments.

FIGS. 14 and 15—Exemplary Methods of Responding to a Failure

FIG. 14 is a flow chart diagram illustrating an exemplary method of responding to a failure of a request for on-demand SI, according to some embodiments. A UE may be powered up (e.g., and/or may initiate its wireless circuitry, as in 902) (1402). The UE may initially operate in 5G NR standalone mode.

The UE may acquire the minimum (e.g., mandatory) SI (e.g., MIB and SIB1) and may camp on a 5G network via a base station (1404). SIB1 may indicate that at least some SIBs are available on-demand (e.g., Si-BroadcastStatus=notBradcasting).

The UE may determine whether a two-step or four-step RACH procedure should be used to request on-demand SI (1406). For example, the UE may determine whether si_SchedulingInfo contains si-requestConfig or si-requestConfigSUL. If either is found, a two-step RACH procedure may be used and the MSG1 may include the request for SI (1408). If neither is found, a four-step RACH procedure may be used and the MSG3 may include the request for SI (1410). For example, a request for SI may be sent as a RRCSystemInfoRequest message.

The UE may determine whether the RACH procedure was successful (1412). If so, the UE may receive the additional SI and may store the information, e.g., overwriting any previous entry for the SIB(s) (1414).

If the RACH procedure was not successful, the UE may determine whether it has a valid copy of the requested SI (1416). If so, the UE may delay the SI request (e.g., until reselection, expiration of the SI (e.g., 3 hours after receipt, among various possibilities), or until a request condition is met) (1418).

If the UE does not have a valid copy of the requested SI, the UE may reselect to another (e.g., a next best available) cell of the same RAT (1420). Such a reselection may be performed even if the cell does not meet the otherwise applicable (e.g., s-criteria) conditions for such a reselection. The UE may consider different (e.g., lower) thresholds for determining whether or not to reselect to the best alternative cell. For example, the UE may consider a signal strength threshold (e.g., RSRP above −105 dBm, among various possibilities) and/or an SNR threshold (e.g., 5 dB, among various possibilities). The UE may determine not to reselect to the best alternative cell if such conditions are not met. If no cell of the same RAT meets such conditions, the UE may disable the RAT and may move to a different RAT (e.g., LTE, among various possibilities). In some embodiments, if no other cell or RAT is found that meets the thresholds for reselection (e.g., as adjusted due to the lack of SI), the UE may continue to camp on the current cell. The UE may delay a further request for the SI, e.g., until a request condition is met as discussed above with respect to 908.

In some embodiments, the reselection of 1420 may be performed according to what specific SI is not available to the UE. FIG. 15 illustrates exemplary failure cases and corresponding exemplary reselection approaches.

As shown, if any RACH procedure successfully results in receiving SI, the received SI may be stored (1502) as discussed above (e.g., 912, 1414).

If a RACH failure occurs during a SIB2 only request (1504), the UE may use a stored version of SIB2 (if available) and/or may avoid any reselection until radio frequency (RF) and/or thermal conditions improve (1518). For example, after conditions improve the UE may be able to perform another SI request (e.g., via another RACH procedure) and may successfully receive the SIB2, and may thus be better informed for reselection.

If a RACH failure occurs during a SIB3 only request (1506), the UE may use a stored version of SIB3 (if available) and/or may perform inter-frequency and/or inter RAT reselections (1520). The UE may avoid any intra-frequency reselection until RF and/or thermal conditions improve.

If a RACH failure occurs during a SIB4 only request (1508), the UE may use a stored version of SIB4 (if available) and/or may perform intra-frequency and/or inter RAT reselections (1522). The UE may avoid any inter-frequency reselection until RF and/or thermal conditions improve.

If a RACH failure occurs during a SIB5 only request (1509), the UE may use a stored version of SIB5 (if available) and/or may perform intra-frequency and/or inter-frequency reselections (1524). The UE may determine if conditions of the current RAT (e.g., NR) are worse than conditions of an alternative RAT (e.g., LTE). If so, the UE may disable the current RAT and fallback to the alternative RAT for a period of time (e.g., 5 minutes, among various possibilities). In other words, the UE may determine the conditions of each RAT, compare the conditions, and disable the RAT of the current serving cell in response to a determination that the alternative RAT offers better conditions.

If a RACH failure occurs during a SIB2 request combined with a request for any other SI (1510), the UE may use a stored version of SIB2 and the other SIB(s) (if available) and/or may avoid any reselection until RF and/or thermal conditions improve (1526).

If a RACH failure occurs during a SIB3 and SIB4 request (1511), the UE may use a stored version of SIB3 and SIB4 (if available) and/or may perform inter RAT reselections (1528). The UE may avoid any intra-frequency and/or inter-frequency reselection until RF and/or thermal conditions improve.

If a RACH failure occurs during a SIB4 and SIB5 request (1512), the UE may use a stored version of SIB4 and SIB5 (if available) and/or may perform intra-frequency reselections (1530). The UE may avoid any inter-RAT and/or inter-frequency reselection until RF and/or thermal conditions improve.

If a RACH failure occurs during a SIB3 and SIB5 request (1514), the UE may use a stored version of SIB3 and SIB5 (if available) and/or may perform inter-frequency reselections (1534). The UE may avoid any inter-RAT and/or intra-frequency reselection until RF and/or thermal conditions improve.

If a RACH failure occurs during a SIB3, SIB4, and SIB5 request (1516), the UE may use a stored version of SIB3, SIB4, and SIB5 (if available) and/or may avoid any reselection until RF and/or thermal conditions improve (1536).

Further Information and Examples

It will be appreciated that the methods of FIGS. 9-15 may be applicable to idle or inactive UEs. UEs in a connected mode may receive on-demand SI without performing a SI request procedure, according to some embodiments.

In some embodiments, a UE may be configured to implement aspects of the methods of FIGS. 9 and 10 as follows. If the UE does not have some/all of the on-demand SIBs for the camped 5G NR cell in the cached SIB database (SIB-DB), the UE may make the following determinations and perform the indicated actions according to the determined circumstances.

If the UE is in RRC_IDLE state, and, if the serving cell has encountered "x" beam failures within a window of "y" seconds, then the UE may go ahead and request for on-demand SIBs which assist in cell re-selection info (e.g., SIB3/4).

Else, if there is data traffic initiated by AP when RRC is in IDLE state, then the UE may piggyback on the RACH procedure initiated for transitioning from RRC_IDLE to RRC_CONNECTED state for the AP data transfer, and may reuse the same RACH procedure for requesting all of the on-demand SIBs.

Else, if there is a NAS signaling procedure initiated when RRC is in IDLE state, then the UE may piggyback on the RACH procedure initiated for transitioning from RRC_IDLE to RRC_CONNECTED state for the NAS signaling procedure, and reuse the same RACH procedure for requesting all of the on-demand SIBs.

Else, if GPS activity is detected on the device, then the UE may initiate a (e.g., RACH) preamble transmission and may request for on demand SIB16.

If the cell has certain very critical SIBs related to CMAS/ETWS alerts as part of the "on demand" SIBs, the UE may blacklist the cell for the next 3 hours.

Once, a particular on demand SIB is acquired by the UE, the UE may store the SIB for the cell over next 3 hours, and may not attempt to acquire this particular on demand SIB as long as UE is camped on same cell for next 3 hours.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a processor configured to cause a user equipment device (UE) to:
receive mandatory system information from a wireless network;
determine a rate of beam failures over time;
determine that the rate of beam failures over time exceeds a threshold;
in response to the determination that the rate of beam failures over time exceeds the threshold, determine to request further on-demand system information;
transmit, to the wireless network, a request for the further on-demand system information; and
receive, from the wireless network, the further on-demand system information in response to the request; and
store the further on-demand system information.

2. The apparatus of claim 1, wherein the processor is further configured to cause the UE to:
perform cell reselection using the further on-demand system information.

3. The apparatus of claim 1, wherein the processor is further configured to cause the UE to:
reselect to a cell of a second wireless network;
receive second mandatory system information from the second wireless network;
determine, based at least in part on the second mandatory system information, that a blacklist condition is met; and
blacklist the cell in response to the determination that the blacklist condition is met.

4. The apparatus of claim 3,
wherein to determine that the blacklist condition is met includes determining that system information relating to commercial mobile alert system or earthquake and tsunami warning system is available on-demand.

5. A user equipment (UE), comprising:
wireless communication circuitry; and
a processor coupled to the wireless communication circuitry and configured to cause the UE to:
receive first system information;
detect ongoing global navigational satellite system (GNSS) activity on the UE;
determine, in response to the detection of the ongoing GNSS activity on the UE, that additional system information is beneficial, wherein the additional system information is relevant to determining location using GNSS in the ongoing GNSS activity; and
transmit, in response to the determination that the additional system information is beneficial, a request for the additional system information.

6. The UE of claim 5, wherein said determining that the additional system information is beneficial includes:
determining if the UE currently has a valid copy of system information that pertains to cell reselection.

7. The UE of claim 5, wherein the processor is further configured to cause the UE to:
detect a failure of the request for the additional system information; and
reselect, in response to the failure, to another cell, wherein the another cell does not meet otherwise applicable conditions for a reselection.

8. The UE of claim 5,
wherein the determination that the additional system information is beneficial occurs at a first time, wherein the processor is further configured to cause the UE to determine, at a second time, that a request condition is met,
wherein the second time is after the first time, wherein said determining that the request condition is met includes:
detecting an opportunity to coordinate the request for the additional system information with another activity.

9. The UE of claim 8,
wherein the another activity is an activity that includes a random access procedure.

10. The UE of claim 5, wherein the processor is further configured to cause the UE to:
receive the additional system information in response to the request; and
store the additional system information.

11. The UE of claim 5, wherein the processor is further configured to cause the UE to determine a location of the UE using the additional system information.

12. The UE of claim 5, wherein the request for the additional system information comprises a request for system information block (SIB) 16.

13. The UE of claim 12, wherein the request for the additional system information further comprises a request for other system information.

14. A method, comprising:
at a user equipment device (UE):
receiving first system information;
determining, in response to a detection of global navigational satellite system (GNSS) activity pending on the UE, that additional system information is beneficial to the GNSS activity pending on the UE, wherein the additional system information is relevant to determining location using GNSS; and
transmitting, in response to the determination that the additional system information is beneficial, a request for the additional system information.

15. The method of claim 14, further comprising:
detecting a failure of the request for the additional system information; and
reselecting, in response to the failure, to another cell, wherein the another cell does not meet otherwise applicable conditions for a reselection.

16. The method of claim 14, further comprising:
determining a location of the UE using the additional system information.

17. The method of claim 14, wherein the request for the additional system information comprises a request for system information block (SIB) 16.

18. The method of claim 14, wherein the request for the additional system information further comprises a request for other system information.

19. The method of claim 14, wherein, in response to the detection of GNSS activity on the UE, the request for the additional system information is transmitted without waiting for an opportunity to piggyback the request for the additional system information with another activity.

20. The method of claim 19, further comprising:
at a different time:
determining that different additional system information is beneficial, wherein the different additional system information is not relevant to determining location using GNSS;
determining that requesting the different additional system information is not urgent; and
delaying a request for the different additional system information by an opportunity to piggyback the request for the different additional system information with another activity.

* * * * *